US007953090B2

(12) United States Patent
Wei et al.

(10) Patent No.: US 7,953,090 B2
(45) Date of Patent: May 31, 2011

(54) METHOD OF MAKING A ROUTER ACT AS A RELAY PROXY

(75) Inventors: Huan-Yun Wei, Taipei (TW); You-Hsin Yen, Taipei (TW); Yi-Hsiang Lin, Taipei (TW)

(73) Assignee: D-Link Corporation, Taipei (TW)

( * ) Notice: Subject to any disclaimer, the term of this patent is extended or adjusted under 35 U.S.C. 154(b) by 221 days.

(21) Appl. No.: 11/979,867

(22) Filed: Nov. 9, 2007

(65) Prior Publication Data

US 2009/0086730 A1   Apr. 2, 2009

(30) Foreign Application Priority Data

Sep. 28, 2007   (TW) ................................ 96136147 A

(51) Int. Cl.
  *H04L 12/28* (2006.01)
  *H04L 12/56* (2006.01)
(52) U.S. Cl. ........................................ 370/392; 370/400
(58) Field of Classification Search .................... None
  See application file for complete search history.

(56) References Cited

U.S. PATENT DOCUMENTS

| 2002/0038371 | A1* | 3/2002 | Spacey | 709/227 |
| 2004/0028035 | A1* | 2/2004 | Read | 370/352 |
| 2007/0157303 | A1* | 7/2007 | Pankratov | 726/11 |
| 2008/0084869 | A1* | 4/2008 | Hearty et al. | 370/352 |

* cited by examiner

*Primary Examiner* — Chirag G Shah
*Assistant Examiner* — Srinivasa R Reddivalam
(74) *Attorney, Agent, or Firm* — Bacon & Thomas, PLLC

(57) ABSTRACT

The present invention is to provide a method of making a router act as a relay proxy, which is applied to a network system comprising a server of an Internet service provider, at least a router, the Internet and at least two network devices, wherein the router and network devices are connected with the server through the Internet respectively. The method comprises the steps of designating the router as a relay proxy when the router receives and accepts a relay request from the server, and directing the network devices to connect to the router designated as a relay proxy respectively when the server attempts to connect the network devices which enables the network devices to communicate and proceed data access with each other through the relay proxy. Thus, the data access with each other of said network devices may be accomplished through said relay proxy instead of said server.

4 Claims, 2 Drawing Sheets

METHOD OF MAKING A ROUTER ACT AS A RELAY PROXY

FIELD OF THE INVENTION

The present invention relates to a router, more particularly to a method of making a router act as a relay proxy and enabling the router to establish a tunnel between any two network devices for communicating and accessing data with each other through the tunnel instead of a server.

BACKGROUND OF THE INVENTION

Due to the absence of central control and the non-private nature of its network protocols, the Internet has blossomed in a decade since its opening to public access in 1990s and successfully integrated most of the existed network systems. Originally, the Internet is a representation of the network systems using Internet Protocol, however, today the Internet refers to not only the IP network systems but all kinds of network systems. The Internet may be the combination of any of the separated substantial networks which are connected with each other via a set of common protocols and logically form a single network. Recently, the technology of connecting computers and the Internet is moving fast that there is a great expansion of the bandwidth from the initial 14.4 Kbps to current 10 even 100 Mbps, ways of establishing connection have evolved from dial-up into numerous wired and wireless approaches, the development of end device is making a progress toward the mobile communication device, and currently other new ways of establishing connection with higher speed are constantly researched and developed.

In response to the popularity of computers and network devices and considerable increase of Internet users, Internet service providers (ISP for short) of all kinds of Internet-related services keep emerging. In general, ISPs provide a wide range of services which comprise connection services for enterprises and individual users like dial-up, ISDN, DSL, cable modem, leased line, as well as server co-location, email, web hosting, virtual hosting, domain name application, web page design and maintenance etc. To use said services, a user is required to apply for an account of an ISP which is then used to login to a server of the ISP before using said services via the Internet. Numerous web servers, email servers and auto-response routers are disposed at the computer facilities of an ISP which enable the connection of said servers with the router of the client through said routers so as to provide network services. So far, the main income of an ISP comes from the access service of the Internet which may be divided into two parts, the dial-up and leased line services. Besides, other value-added services like providing particular contents, electronic commerce, web page building, network advertising, hard disk leasing and other network services have also become important sources of income for ISPs. Traditionally, users access the data provided by ISPs, but as the amount of data exchanged between users increases dramatically for services like VoIP and network video surveillance etc., ISPs start providing access service for the devices used. The goal of said new kind of ISP is to provide telecommunication service without physical network that new services of VoIP and network video surveillance etc. may be available to users through said access service after network devices of the clients are connected with the Internet.

Due to limited funding and resources, usually said new kind of ISPs are incapable of providing sufficient bandwidth which results in unpleasant user experience for congestion and poor performance. To enhance the performance, said new kind of ISPs are forced to rent bandwidth from other ISPs so as to provide stable and high-speed network services. However, as the amount of users keeps increasing, either more bandwidth must be rented or more money must be invested in new facilities to ensure the constant high quality of the network environments.

Hence, for numerous ISPs, to develop a network system which enables ISPs to constantly provide high-quality network environments as the amount of users keeps increasing without renting more bandwidth or investing in new facilities has become an important objective to be achieved.

SUMMARY OF THE INVENTION

For the purpose of solving the problems stated above that many Internet service providers are forced to constantly rent more bandwidth or invest in new facilities corresponding to the expanding population of their users, after hard work of research and experiments for a long time, the inventor has developed a method of making a router act as a relay proxy of the present invention which enables the Internet service providers to provide stable network environment as the users keep increasing without renting more bandwidth or investing in new facilities.

One of the objectives of the present invention is to provide a method of making a router act as a relay proxy applied to a network system which comprises a server of an Internet service provider, at least a router, the Internet and at least two network devices wherein the router is used by a subscriber of the Internet service provider and the router and network devices are connected with the server through the Internet respectively. Said method comprises the steps of the server designating the router as a relay proxy when a relay request from the server is received and accepted by said router, and the server directing the network devices to connect to the router designated as a relay proxy respectively when the server attempts to connect the network devices which enables the network devices to communicate and proceed data access with each other through said relay proxy. Thus, the data access with each other of said network devices may be accomplished through said relay proxy instead of said server.

Another objective of the present invention is to connect the network devices and enable the data access between them through said tunnel instead of said server so as to reduce the bandwidth utilization of said server effectively and substantially cut down the cost of additional bandwidth or new facilities.

BRIEF DESCRIPTION OF THE DRAWINGS

The foregoing aspects, as well as many of the attendant advantages and features of the present invention will become more apparent by reference to the following detailed description, when taken in conjunction with the accompanying drawings, wherein.

DETAILED DESCRIPTION OF THE PREFERRED EMBODIMENT

The so-called proxy is a kind of network device act as an intermediate node which is traditionally used to avoid access control or speed up data access. In the case of avoiding access control, when the Internet Protocol address (IP address for short) of a computer is blocked by certain website, the connection between said computer and said website may be established via a relay proxy on the Internet through connecting said computer to said relay proxy, then taking said relay proxy as an intermediate node. In this way, the computer may establish a connection with said website and proceed data access through the relay proxy since the IP address of the relay proxy is different from that of the computer and is not blocked by said website. Besides, most of the relay proxies are equipped with huge storage space and capable of constantly holding newly acquired data that they are capable of buffering and may be treat as large cache memory. So in the case of speeding up data access, when the data requested by a computer have been already stored in a storage device of the relay proxy and being the latest, the relay proxy will directly transfer the data stored in the storage device to the computer instead of sending data request to the server of the website which substantially enhances the speed of browsing and performance of the computer.

Figure 1:
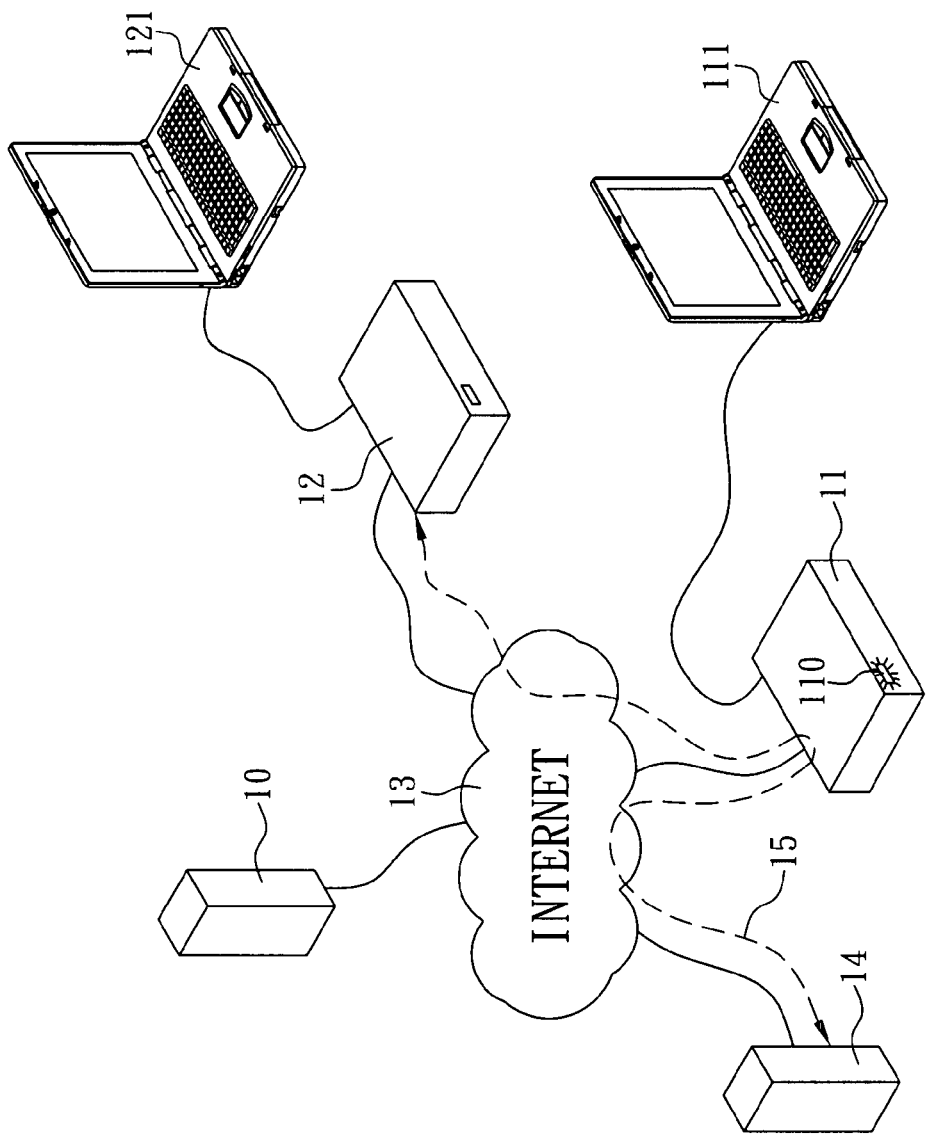
FIG. 1 shows a network composed of a server of an Internet server provider, NAT routers and the Internet.

According to the operation of said relay proxy, not for the objectives of avoiding access control or speeding up data access, the inventor has developed a method of making a router act as a relay proxy which utilizes the network bandwidth of the router to cut down the cost of renting bandwidth from other ISPs. Please refer to FIG. 1, the method of the present invention is applied to a network system which comprises a server 10 of an ISP, at least a router 11 (hereinafter, the first router 11), the Internet 13 and at least two network devices 14, wherein the network devices 14 are exemplified with two network devices in following embodiments, a network device marked 14 which may be a web camera or a web phone and another network device which comprises a second router 12 and a personal computer 121. However, in other embodiments of the present invention, said network system is not limited to the examples stated above but may comprise more than two network devices. The routers 11 and 12 represent the routers used by the subscribers of the ISP, and the routers 11, 12 and the network device 14 are connected with the server 10 through the Internet 13 respectively. According to the method of the present invention, the first router 11 is designated as a relay proxy when the first router 11 receives and accepts a relay request issued by the first router 11. When the second router 12 attempts to establish a connection with the network device 14 connected with the Internet 13 for data access through the server 10, the server 10 will designate the first router 11 as the relay proxy between the second router 12 and the network device 14 thus establishes a tunnel 15 which enables the second router 12 to directly connect with the network device 14 through the tunnel 15 for data access.

Figure 2:
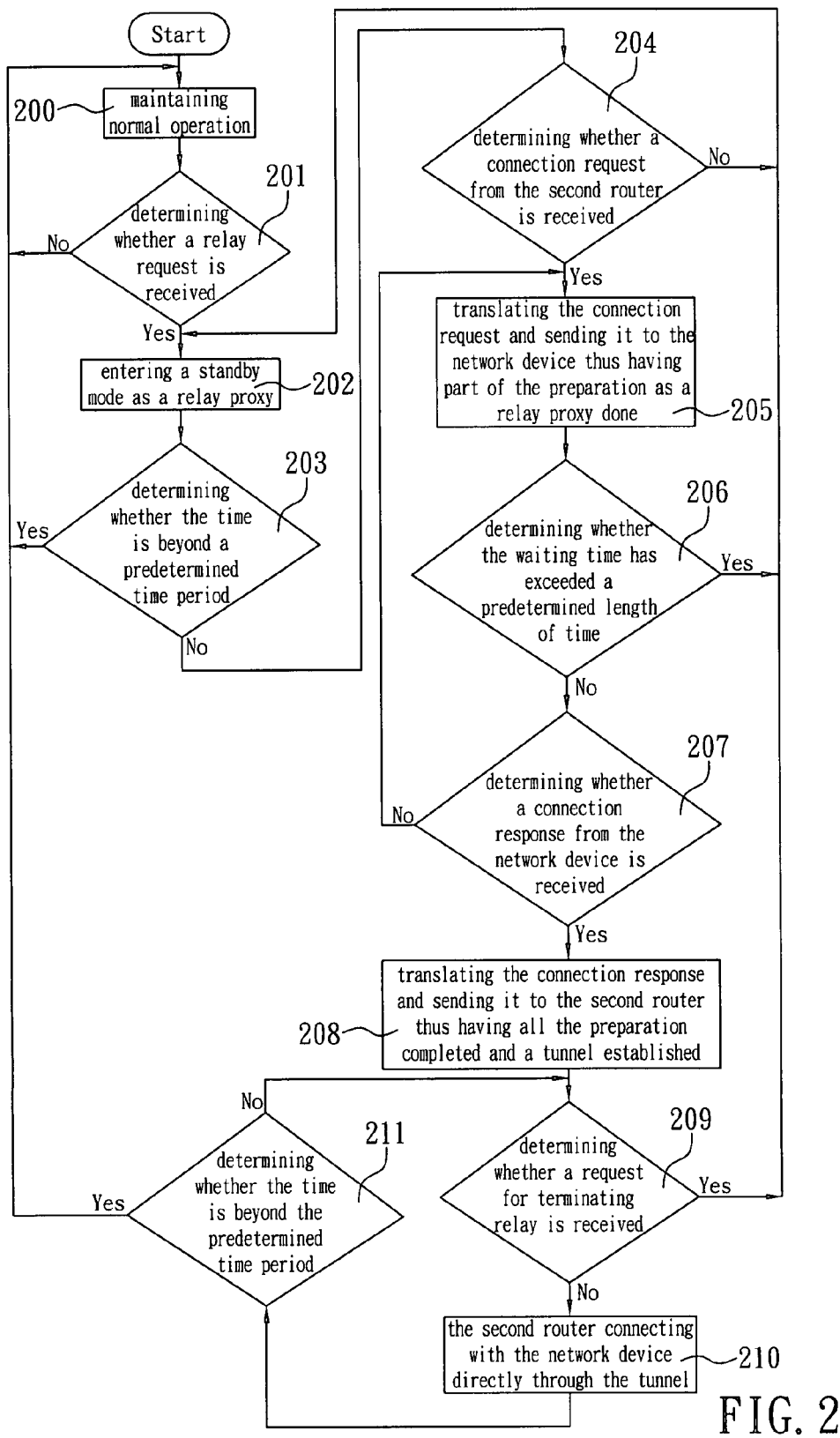
FIG. 2 is a flow chart of a preferred embodiment of the present invention.

Please again refer to FIG. 1, in one embodiment of the present invention, when a first user makes a registration to the server 10 and becomes a subscriber of the ISP, the user is required to agree provision of the first router 11 as a relay proxy of the server 10, and the service time like 1 a.m. to 7 p.m. every Monday through Friday may be designated when registration. Thus, the first user may offer the bandwidth of the first router 11 without interference of the normal operation of the personal computer 111 and get allowances and free messages from the server 10 in exchange. When a second user makes use of the personal computer 121 and attempts to connect with the network device 14 through the server 10 using the second router 12, the server 10 will designate the first router 11 as a relay proxy between the second router 12 and the network device 14. Please refer to FIG. 2, the steps of the first router 11 for establishing a tunnel 15 through which the second router 12 may directly connect with the network device 14 comprise:

(200) maintaining normal operation;

(201) determining whether a relay request issued from the server 10 is received and whether the first router 11 has agreed to be a relay proxy of the server 10 at a predetermined time period, proceeding with step (202) when affirmative, otherwise returning to step (200);

(202) entering a standby mode as a relay proxy and turning on an indication light 110 of the first router 11 for indication;

(203) determining whether the time is beyond the predetermined time period, returning to step (200) when affirmative, otherwise proceeding with step (204);

(204) determining whether a connection request from the second router 12 is received, proceeding with step (205) when affirmative, otherwise returning to step (202);

(205) receiving the connection request from the second router 12 thus having part of the preparation as a relay proxy done;

(206) determining whether the waiting time has exceeded a predetermined length of time, returning to step (202) when affirmative, otherwise proceeding with step (207);

(207) determining whether a connection response from the network device 14 is received, proceeding with step (208) when affirmative, otherwise returning to step (205);

(208) receiving the connection response from the network device 14 thus having all the preparation as a relay proxy completed and the tunnel 15 established between the second router 12 and the network device 14 wherein the tasks of the relay proxy are to translate the source and destination addresses of a connection request from a network device (a connection request with another network device) into the IP addresses of the relay proxy and said another network device respectively, send the translated request to said another network device, translate the source and destination addresses of a connection response from said another network device into the IP addresses of the relay proxy and said network device respectively, and send the translated response to said network device, i.e. in the present embodiment, the first router 11 will translate the packets from the second router 12 into its own packets to the network device 14 and translate the packets from the network device 14 into its own packets to the second router 12;

(209) determining whether a request for terminating relay from the server 10 is received, returning to step (202) when affirmative, otherwise proceeding with step (210);

(210) the second router 12 connecting with the network device 14 and proceeding data access directly through the tunnel 15; and (211) determining whether the time is beyond the predetermined time period, returning to step (200) when affirmative, otherwise proceeding with step (209) until a request for terminating relay from the second router 12 is received.

Please refer to FIG. 1 again, with the method stated above, the second router 12 may access data of the network device 14 without passing through the server 10 which may effectively reduce the bandwidth utilization of the server 10 and substantially cut down the cost of renting extra bandwidth or investing in new facilities.

To be noted, the embodiment stated above is a preferred embodiment which is not a limitation of the present invention while implementation. In other embodiment of the present invention, after entering the standby mode as a relay proxy, the first router 11 will automatically return to the standby mode (i.e. return to step (202)) when it is determined that the waiting time has exceeded the predetermined length of time or a request for terminating relay from the server 10 is received in any subsequent step. Besides, in any subsequent step, that the current time is beyond the predetermined time period as a relay proxy of the server 10 will make the first router 11 automatically return to normal operation (i.e. return to step (200)) as well.

While the invention herein disclosed has been described by means of specific embodiments, numerous modifications and variations could be made thereto by those skilled in the art without departing from the scope and spirit of the invention set forth in the claims.

What is claimed is:

1. A method of making a router to act as a relay proxy, which is applied to a network system comprising a server of an Internet service provider, at least a router, the Internet and at least two network devices, wherein said router is connected to said network devices and said server through the Internet respectively, comprising steps of:

said router making a registration to said server, which enables said router to be a subscriber of said Internet service provider and act as a relay proxy of said server;

said router designating a time period to act as said relay proxy when said router makes said registration;

said router receiving a packet issued from said server;

said router determining whether or not said packet is a relay request received within said time period;

said router entering a standby mode of acting as said relay proxy when it is determined that said packet is said relay request and is received within said time period;

said router acting as said relay proxy of said server to establish a tunnel between said network devices when one of said network devices is going to connect with the other network device through said server, which enables said network devices to directly connect with each other and proceed data access through said tunnel;

after acting as said relay proxy, said router automatically returning to said standby mode when it is determined that waiting time has exceeded a predetermined length of time or a request for terminating relay issued from said server is received in any subsequent step; and after acting as said relay proxy, said router automatically returning to normal operation when it is determined that current time is beyond said time period in any subsequent step.

2. A method of making a router to act as a relay proxy of claim 1 further comprises a step of:

said router turning on an indication light of said router when said router enters said standby mode.

3. A method of making a router to act as a relay proxy of claim 1 further comprises a step of:

when a connection request from said network device is received, said router translating the source and destination addresses of said connection request into IP addresses of said router and said the other network device respectively and sending said translated connection request to said the other network device.

4. A method of making a router to act as a relay proxy of claim 3 further comprises a step of:

when a connection response from said the other network device is received, said router translating the source and destination addresses of said connection response into IP addresses of said router and said network device respectively and sending said translated connection response to said network device.

* * * * *